Figure 7:
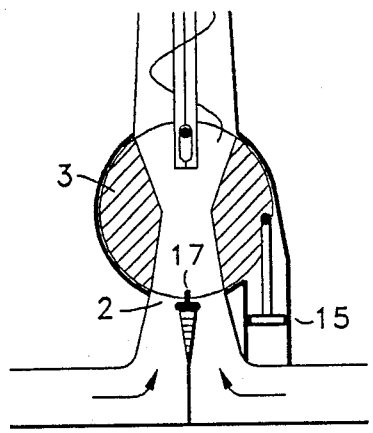

United States Patent [19]

Stewart

[11] Patent Number: 4,877,181

[45] Date of Patent: Oct. 31, 1989

[54] SHOWER VALVE

[76] Inventor: John V. Stewart, 1308 Henry Balch Dr., Orlando, Fla. 32810

[21] Appl. No.: 233,578

[22] Filed: Aug. 18, 1988

[51] Int. Cl.[4] ............................................. G05D 23/13
[52] U.S. Cl. ............................... 236/12.17; 137/625.41
[58] Field of Search .......................... 236/12.16, 12.17; 137/625.41, 625.47, 637; 251/48

[56] References Cited

U.S. PATENT DOCUMENTS

| | | | |
|---|---|---|---|
| 1,787,304 | 12/1930 | Becker | 236/12.17 |
| 2,017,194 | 10/1935 | Zimmermann | 236/12.17 |
| 2,069,040 | 1/1937 | Lodder | 236/12.17 |
| 2,146,929 | 2/1939 | Bassett, Jr. | 236/12.17 |
| 2,494,044 | 1/1950 | Jurisich et al. | 236/12.17 |
| 2,546,423 | 3/1951 | Bentsen | 236/12.17 |
| 3,701,364 | 10/1972 | Hara | 137/625.41 |
| 3,934,776 | 1/1976 | Smith, Jr. et al. | 251/48 X |
| 4,349,149 | 9/1982 | Humpert | 236/12.16 |

FOREIGN PATENT DOCUMENTS 2802377  7/1979  Fed. Rep. of Germany ... 236/12.17

Primary Examiner—William E. Tapolcai

[57] ABSTRACT

A valve and thermostat assembly is disclosed for improved convenience and efficiency in showers. It comprises a thermostat controlled hot/cold water mixing valve combined with a flow valve. It provides a full range of graduated control for both temperature and flow rate, and maintains a set temperature when the flow rate is changed. Temperature can be preset, and the hot/cold ratio is automatically controlled. This avoids iterative manual adjustment, saving time and water. Flow can be temporarily shut off during a shower for economy without causing a cooler temperature at restart. It is safe, practical to manufacture, and installs with normal plumbing skills. It is not electric.

15 Claims, 2 Drawing Sheets

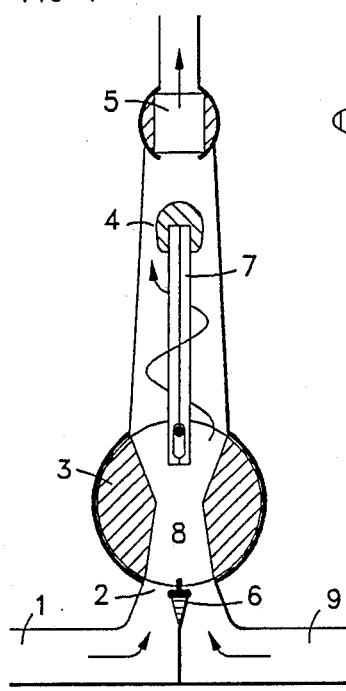
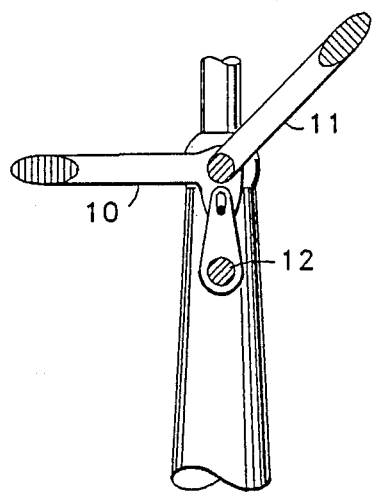
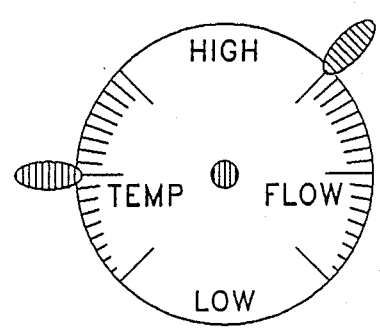
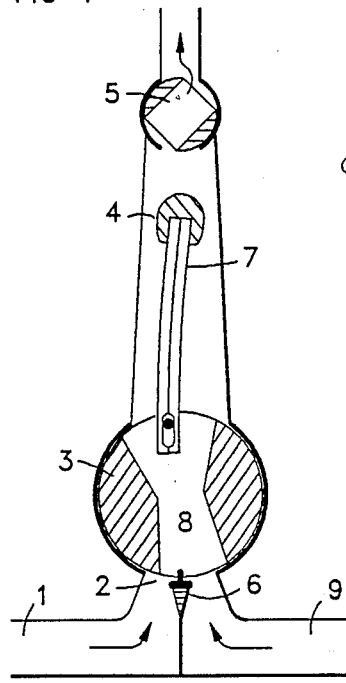
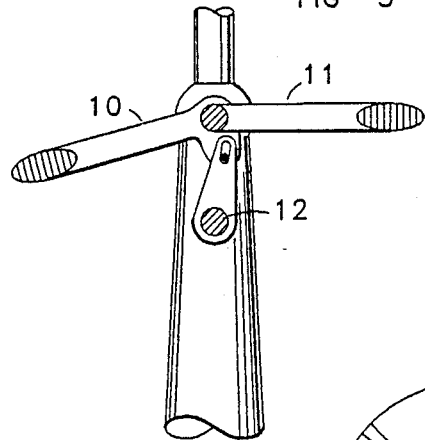
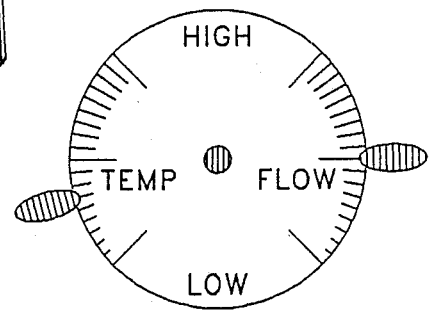

SHOWER VALVE

BACKGROUND

1. Field of Invention

This invention relates to water faucets used for baths and showers.

2. Prior Art

Several types of faucets for bathing are available. Some have separate valves and handles for hot and cold. Others have a single control lever which rotates on two axes, controlling flow and mixture. Some have a single control lever which rotates on only one axis for temperature control, providing full flow volume at all positions besides "off". Shower heads are available which provide an auxiliary flow control valve allowing temporary water shutoff for economy during a shower. Each of these has disadvantages which are solved by the present invention.

The common dual faucet assembly requires an iterative temperature adjustment at the start of each shower while the hot water temperature stabilizes after reaching the valve. The adjustment period increases with the distance to the water heater. The water pipe absorbs more heat at first, so the hot water temperature gradually rises to a stabilization point. After stabilization, changing the hot water flow rate has an immediate effect on shower temperature. However, the new hot flow rate changes the percentage of heat lost in transit from the heater, so the output temperature will gradually change to a new stabilization point, prompting further adjustment. The cold water flow rate adds another variable. The variables of hot and cold flow rate, hot temperature, stabilization rate, mixed temperature, and total flow rate, are interdependent.

Time and water is wasted during the adjustment period. The total waste is substantial, since this activity is performed every day by many people. As a ballpark figure, assume 100,000,000 baths or showers a day are taken in the U.S., with the following three roughly estimated categories of waste. This invention offers partial savings in the second and third categories, although its main claimed benefit is user convenience.

| WASTED SECONDS | WASTED GALLONS | DESCRIPTION |
| --- | --- | --- |
| (a) 20 | 1 | Water in transit from heater to valve |
| (b) 20 | 1 | Iterative temperature and flow adjustment |
| (c) 0 | 1 | Water running while soaping only |
| TOTAL DAILY WASTE IN U.S. | | 1,000,000 man-hours 300,000,000 gallons |
| TOTAL YEARLY WASTE IN U.S. | | 365,000,000 man-hours 100,000,000,000 gallons |

A shower faucet often found in hotels has a single control handle for the hot/cold mixing ratio, which also turns the flow on or off. Adjustment is simplified by the lack of graduated flow control. The tradeoff is waste due to excessive flow. Iterative temperature adjustment is still required, although it is made easier.

An auxiliary flow valve can be installed past the water mixing point, providing independent control of the total flow rate. Such a valve is available in some shower heads, for temporary shutoff, saving in category c). However, the water is cooler when restarted, due to heat loss while the flow is stopped. Shower heads are generally not adequately leakproof to provide a primary shutoff, so the mixture valves are used, and must be readjusted at each shower.

Such an auxiliary valve can be fully leakproof, and the mixture controls left at their last setting between showers. However, cold water then runs during startup, wasting both water and time.

Another approach is to heat water at its point of use. This is effective and efficient in terms of time, water, and heating energy. However, it is expensive to install a water heater at each point of use, and it requires the skills of both an electrician and plummer. It also adds complexity and priority to maintenance and repair. Improper or damaged installation presents electric shock hazard at its most dangerous site.

OBJECTS AND ADVANTAGES

The object of this invention is to meet the following criteria for the most desirable shower valve:

1. Provide a full range of graduated control for both temperature and flow rate.
2. Allow temperature to be present, so that iterative adjustment is not needed.
3. During startup, allow only the hot side to flow until hot water reaches the valve.
4. Maintain a set temperature when the flow rate is changed.
5. Provide convenient temporary shutoff for economy during a shower, without needing readjustment on restart.
6. Only normal plumbing skills should be required for installation and maintenance. No electricity.

As will be seen from the description, all of these criteria are met in a practical way in the present invention.

DRAWING FIGURES

Figure 8:
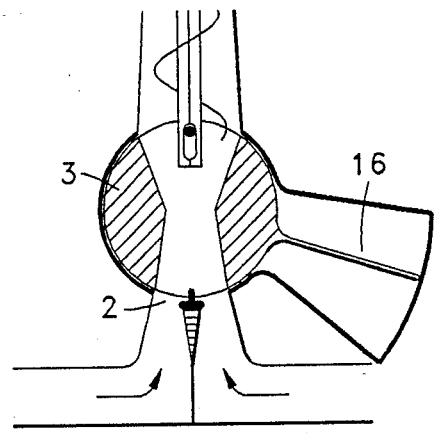

FIG. 1 - Section view;
FIG. 2 - Front elevation related in FIG. 1;
FIG. 3 - Dial face related to FIG. 1;
FIG. 4 - Section view, reduced temperature and flow rate;
FIG. 5 - Front elevation related to FIG. 4;
FIG. 6 - Dial face related to FIG. 4;
FIG. 7 - Mixing valve with piston damper;
FIG. 8 - Mixing valve with paddle damper.

DRAWING REFERENCE NUMERALS

1. Hot inlet flow path
2. Mixture valve inlet aperture
3. Rotatable mixture valve element
4. Rotatable anchor of bi-metallic element
5. Flow valve
6. Separator baffle
7. Bi-metallic thermostat element
8. Mixing valve throat
9. Cold inlet flow path
10. Temperature control arm
11. Flow rate control arm
12. External shaft of rotatable anchor
15. Piston damper
16. Paddle damper

DESCRIPTION

FIG. 1 is a section view showing the device adjusted for high flow and medium temperature. Total flow rate is controlled by valve 5, which is shown in its full open position. Mixture is controlled by mixing valve element 3, shown in its centered position. FIGS. 1, 2, and 3 are related regarding component positions. FIGS. 4, 5, and 6 are similarly related.

FIG. 1 shows hot and cold flows entering inlet ports 2 in a mixing valve. Item 3 is the rotatable element of the mixing valve. It rotates in the plane of the section, and is shown centered in fig 1, admitting equal amounts of hot and cold water. Anchor 4 is rotatable via external shaft 12 of FIG. 2. The anchor rotates thermostat element 7, thence mixing valve element 3, thus controlling the mixture setting. The thermostat element is used as a linkage arm. By virtue of its bi-metallic structure, it deforms predictably under temperature change, affecting the mixture valve to compensate for departures from the selected temperature.

A simplified embodiment may omit the thermostat element, using a simple linkage arm from anchor 4 to mixing valve element 3. The description will focus mainly on the thermostat embodiment.

The rotation resistance of the mixing valve must be light by comparison to that of anchor 4. Anchor rotation resistance includes the friction of shaft 12 against its seal. Additional friction can be provided, if needed, by light contact of control arm 10 with the dial (FIG. 3) near its circumference. Valve element 3 should rotate nearly friction free for responsiveness to the thermostat. Tightness is not required in this valve, although reasonably close tolerances are desirable. Hydrodynamic forces should be essentially neutral against the rotation moment of element 3 in all its positions. In the mixing valve embodiment shown, inlet pressure is directly inward toward the axis of rotation of element 3, and exerts no rotational moment. The valve should be tested for oscillation in a variety of conditions, and redesigned or damped if necessary.

Appropriate damping means includes increasing the rotation inertia of element 3, via its size, shape, or material, or the use of a paddle or piston for water-viscosity damping. If a piston is used, it can fit loosely in its cylinder and have no valves or rings, allowing water to squeeze past it in both directions of travel. These means can be implemented without substantially increasing rotation resistance against slow rotation speeds.

Baffles or foils can be used to insure mixing of hot and cold water prior to its flowing past the thermostat element. An appropriate location for such foils is in the throat 8 of the mixing valve. These must not exert rotational moment upon element 3 about its axis of rotation. A suggested means is a blade foil crossing the throat from cold to hot side. A partial twist at the foil's center provides symmetrically opposed foils on opposite sides of the throat to induce water rotation. For example, a twist of 60 degrees provides effectively two foils of 30 degree deflection. The moment of rotation thus exerted upon valve element 3 is perpendicular to its plane of rotation, which is not detrimental.

A rotation range of 90 degrees is shown for each control arm, 10 and 11. Arm 11 connects directly to the shaft of flow control valve 5. When this arm is at its lowest position, the throat of valve 5 is perpendicular to the flow path, and flow is stopped. As the arm is rotated upward, the valve throat becomes parallel to the flow path, reducing flow restriction toward its minimum.

For symmetry of use and appearance, control arm 10 also rotates 90 degrees. This rotation must be reduced to an appropriate range for rotatable anchor 4. A reduction linkage between arm 10 and shaft 12 can be implemented using linked lever arms as shown in FIG. 2. It can also be done with gear segments of differing diameters. Gears provide a constant reduction ratio, while linked lever arms increase the reduction toward the extremes of arm range.

The bi-metallic element is illustrated in the form of a straight, thick embodiment for clarity. However, it may be longer, thinner, coiled, and so forth. FIG. 1 shows this element in neutral stress, which is expected to be designed for a nominal medium temperature, such as 95° F. (35° C.). At other temperatures the element deforms and modifies the mixture valve setting. The magnitude of this modification should be such that when the temperature control is set at medium, and the water is cold, the mixture valve is modified to full hot. This brings hot water rapidly to the valve during the start-up period. A nominal "cold" water temperature can be considered 80° F. (26.7° C.), or less, since this is substantially below the average desired bath temperature.

In general, the thinner the bi-metallic element, the more responsive the thermostat, and the less forceful. This is a design tradeoff. However, forcefulness can be increased without reducing responsiveness by increasing the bi-metallic blade width.

The thermostat will try to prevent all temperature deviations, including intentional adjustments. This must be taken into account in the range of motion of anchor 4. As shown in FIG. 4, anchor 4 must rotate farther to achieve a given adjustment than if a simple, rather than bi-metallic, arm were used. The range of anchor motion is determined by the reduction ratio in the linkage from control arm 10 to shaft 12.

Mixture control should be independent of flow control, so that temperature adjustment does not change the total flow rate. The mixing valve throat should unblock a total inlet area which is greater, under all conditions, than some later restriction point in the device. Each inlet aperture must individually meet this same criterion, since one aperture may be completely blocked. The flow control valve itself will be the most restrictive aperture under at lest some conditions. If it is not so when fully open, then another restriction point subsequent to the mixing valve must apply.

Cross flow between the cold and hot water inlet pipes of this device should be prevented when it is not in use. This could occur when open valves elsewhere on either line causes a pressure differential between the hot and cold sides. The mixing valve should normally block the cold side when the thermostat cools between uses, as mentioned previously regarding thermostatic modification magnitude. The seal between element 3 and the baffle 6 separating the hot and cold inlet apertures should be adequate for this purpose. A reasonable seal can be achieved via close radial tolerance between element 3 and baffle 6 at that point. However, radial contact should be avoided to prevent a sticking valve. The seal is improved if the baffle extends radially inward and serves as a stop for valve rotation in each direction. This provides a line of direct contact against the valve throat edge. A perfect seal is not necessary, but cross flow should be restricted to an insignificant amount so that hot water is not wastefully pulled into the lines by the use of a cold water valve elsewhere. Another means for cross-flow prevention is a check valve on each inlet pipe, allowing flow only toward the mixing valve.

FIG. 2 is an elevation view of the upper part of the device, showing the two control arms. Flow control arm 11 is directly connected to the shaft of valve 5, while temperature control arm 10 is reduction-linked to shaft 12, which rotates the thermostat anchor 4.

FIG. 3 is a suggested dial face design, with 90 degrees ranges of motion for each control arm. The 'TEMP' and 'FLOW' lettering can be replaced with graphic symbols, or icons, for international recognition. The 'HIGH' or 'LOW' lettering is redundant, given the expected vertical orientation of the dial, especially if graphically graduated scales are used, as shown.

FIGS. 4, 5, and 6 illustrate the internal element position changes resulting from control arm rotation. The temperature has been adjusted cooler, and flow rate has been lowered to medium.

FIGS. 7 and 8 illustrate piston damping and paddle damping of the mixing valve.

PREFERRED EMBODIMENT

The preferred embodiment is essentially as illustrated in FIGS. 1-6, with the following differences:

The bi-metallic element is thin, for fast response, and wide for strength. It may be coiled.

The dial face has icons in place of 'TEMP' and 'FLOW'. The 'HIGH' and 'LOW' lettering is not used.

Mixing foils, as described.

For environments with hot and cold water pressures that are often substantially unequal, embodiments with check valves or constant pressure valves should be available.

A low-priced version should be available which has no thermostat element, using a simple lever arm instead.

OPERATION

The user sets the temperature control to medium, or to a setting established by previous use, and rotates the flow control to full flow. When the water warms, flow rate is lowered if desired. Temperature adjustment is unnecessary once a setting is established from previous use.

With a non-thermostat embodiment, the temperature control may be rotated to full hot at first, to speed warm-up, then adjusted or placed on a previously established setting.

I claim:

1. An apparatus for mixing two fluids of different temperatures, and controlling the resultant and total flow volume, comprising in combination:
    mixing-valve means for mixing two fluids in controllable proportion, having a first control shaft, and a case with two fluid inlets and an elongated fluid outlet;
    a flow valve having a second control shaft, said flow valve mounted in said outlet;
    first and second control levers, connected to said first and second control shafts respectively;
    a control dial mounted on the exterior of said case, having a dial face with means for indicating the positions of the control levers; said control levers mounted on the exterior of said case approximately concentric with the control dial.

2. The apparatus of claim 1 wherein said indicating means comprises two diametrically opposed arcuate segments of marks on said face, and said two control levers are mounted approximately concentrically with said segments.

3. The apparatus of claim 1, wherein said two inlets are adjacent, and further including a rotatable element within said case, said element having a throat therethrough, and rotatable to position one end of the throat in register with both of said inlets, or to block either of said inlets to a variable degree, the second end of the throat in approximate register with said outlet.

4. The apparatus of claim 3, further including a pivot arm within said elongated outlet, upstream from said flow valve, one end of the arm connected to said rotatable element, the second end of the arm connected to said first control shaft, reduction-linkage means for linking said first control lever to said first control shaft and transmitting, at a reduced ratio, rotary motion from said first control lever to said first control shaft.

5. The apparatus of claim 4, wherein said pivot arm is constructed of a plurality of materials with different expansion coefficients.

6. The apparatus of claim 3 further including a piston damper comprising a cylinder integral with said case, a piston loosely fitted within said cylinder, and a piston rod, one end of which is connected eccentrically to said rotatable element, and the second end is connected to said piston.

7. The apparatus of claim 3 further including a paddle damper, comprising a hollow extension of said case, adjacent the circumference of said rotatable element, a paddle connected to said element and extending radially from said element into said extension.

8. The apparatus of claim 3 wherein said one end of said throat has leading and trailing edges, and further including a stop, protruding into said throat from between said two inlets, and having sides which match in shape said edges.

9. An apparatus for mixing two fluids of different temperatures, and controlling the resultant temperature and total flow volume, comprising:
    a mixing valve having a rotable element in a fitted case;
    said case having two adjacent fluid inlets and an elongated fluid outlet;
    said rotatable element having a throat therethrough, and rotatable to position one end of the throat in register with both of said inlets, or to block either of said inlets to a variable degree, the second end of the throat in approximate register with said outlet;
    a pivot arm contained in said elongated outlet, connected to one end to said rotatable element, and at the second end to a first control shaft;
    a flow valve mounted in said elongated outlet, downstream from said pivot arm, and having a second control shaft;
    a control dial mounted on the exterior of said case, having two control levers and a dial face with means for indicating the positions of said levers;
    said levers connected to said two control shafts.

10. The apparatus of claim 9 wherein said indicating means comprises two diametrically opposed arcuate segments of marks on said face, and said two control levers are mounted approximately concentrically with said segments.

11. The apparatus of claim 9 further including reduction-linkage means for linking said first control lever to said first control shaft and transmitting, at a reduced ratio, rotary motion from said first control lever to said first control shaft.

12. The apparatus of claim 9 wherein said pivot arm is constructed of a plurality of materials of different heat expansion coefficients.

13. The apparatus of claim 9 further including a piston damper comprising a cylinder integral with said case, a piston loosely fitted within said cylinder, and a piston rod, one end of which is connected eccentrically to said rotatable element, and the second end is connected to said piston.

14. The apparatus of claim 9 further including a paddle damper, comprising a hollow extension of said case, adjacent the circumference of said rotatable element, a paddle connected to said element and extending radially from said element into said extension.

15. The apparatus of claim 9 wherein said one end of said throat has leading and trailing edges, and further including a stop, protruding into said throat from between said two inlets, and having sides which match in shape said edges.

* * * * *